United States Patent [19]

Muraishi et al.

[11] 4,409,707
[45] Oct. 18, 1983

[54] RETAINER

[75] Inventors: Masakazu Muraishi, Higashimurayama; Kimio Sawazaki, Fussa, both of Japan

[73] Assignee: Nissan Motor Co., Ltd., Yokohama, Japan

[21] Appl. No.: 199,133

[22] Filed: Oct. 22, 1980

[30] Foreign Application Priority Data

Oct. 26, 1979 [JP] Japan .................. 54-149431

[51] Int. Cl.³ .............................................. A44B 17/00
[52] U.S. Cl. .................................. 24/214; 24/213 CS; 24/216
[58] Field of Search ............ 24/216, 217, 208 R, 24/208 A, 213 R, 214, 213 CS; 411/61

[56] References Cited

U.S. PATENT DOCUMENTS

| 2,933,794 | 4/1960 | Biesecker | 24/216 |
| 2,937,834 | 5/1960 | Orenick et al. | 24/216 |
| 3,074,134 | 1/1963 | Buechler | 24/73 |
| 3,757,388 | 9/1973 | Wolnt | 24/201 R |
| 4,176,428 | 12/1979 | Kimura | 24/217 R |

FOREIGN PATENT DOCUMENTS

| 948975 | 6/1974 | Canada | 411/61 |
| 686862 | 3/1961 | Fed. Rep. of Germany . | |
| 2156611 | 5/1972 | Fed. Rep. of Germany . | |
| 2161175 | 7/1973 | France | 411/61 |
| 656806 | 9/1951 | United Kingdom . | |
| 1057763 | 1/1964 | United Kingdom . | |
| 1034865 | 7/1966 | United Kingdom . | |
| 1222555 | 2/1971 | United Kingdom . | |
| 1353963 | 5/1974 | United Kingdom . | |
| 1376496 | 12/1974 | United Kingdom . | |
| 1488389 | 10/1977 | United Kingdom . | |
| 1558675 | 1/1980 | United Kingdom . | |

Primary Examiner—Robert A. Hafer
Attorney, Agent, or Firm—James Creighton Wray

[57] ABSTRACT

A retainer (21) for securing an article, e.g. a seat cushion, to a vehicle body consists of plastics-made hollow main body (22) which is inserted into an opening (8) in a vehicle body panel (6). The main body is provided on its outer surface with projections (26, 27a, 27b) which engage with upper and lower surfaces of the panel to prevent withdrawal of the retainer. The main body has an inner space with an open top end (22a) which permits insertion of a frame portion (2, 30) of the seat cushion into the inner space. The main body is further provided on its inner surface with projections (24a, 24b) which prevent withdrawal of the frame portion from the inner space. The inner space is open at the top end only, at least when the frame portion is retained in the inner space, so as to prevent entry of water or dust into the cabin even when the space below the body panel is not closed.

5 Claims, 12 Drawing Figures

RETAINER

BACKGROUND OF THE INVENTION

1. Field of the Invention

The present invention relates to a retainer for securing a desired article to a vehicle body.

2. Description of the Prior Art

In order to detachably mount a desired article, such as a seat cushion, to a vehicle body without using bolts and nuts, various types of retainers or clips are known. For example, Japanese Utility Model Application No. 72,308/76 which has been laid open for public inspection discloses such a retainer, which consists of a substantially V-shaped metallic strip and is passed through an opening in a body panel such that an engaging portion of the article to be mounted on the body panel is retained by the lower end portion of the retainer while the upper end portion of the retainer is retained by the body panel.

More particularly, as shown in FIGS. 1 to 3, the abovementioned retainer 1 retains a substantially U-shaped lower extension 2 of a seat cushion frame at its lower end 3 which is restricted upwardly to form neck portions 4, 4 thus preventing withdrawal of the extension 2. The lower end 3 is connected, through the neck portions 4, 4, with middle portions 9, 9 which are resiliently urged outward in opposite directions such that the retainer is expanded. The middle portions 9, 9 are passed through openings 7, 8 formed in the floor mat 5 and the body panel 6, respectively, with the middle portions 9, 9 contracted toward each other. The side edges 10, 10 of each middle portion 9 are extended to engage with the lower surface of the body panel 6 when the middle portions 9, 9 are expanded below the body panel 6. The center parts 11, 11 of the middle portions 9, 9 extend through the openings 7, 8 and engage with the upper surface of the floor mat 5 which is pierced by sharp edges 12, 12 at the free ends of the center parts 11, 11.

With the above arrangement, the space between the middle portions 9, 9 is not closed on both sides so that the space below the body panel 6 must be closed by an additional lower panel 6'. Otherwise, foreign material including water and dust is permitted to enter into the cabin through the open sides of the retainer and the openings in the body panel and the floor mat. This is disadvantageous in that the location of the retainers cannot be determined relatively freely as they have to be mounted in a closed space, and that reduction of the vehicle weight is interrupted by the additional lower panel to provide the closed space.

SUMMARY OF THE INVENTION

Therefore, it is an object of the present invention to provide an improved retainer which mitigates the above-mentioned disadvantages.

According to the present invention, there is provided a retainer for securing an article to a vehicle body, comprising a main body which consists of plastics material and is adapted to be inserted into an opening in a panel forming a portion of the vehicle body, said main body being provided on its outer surface with a first projection which is urged against the upper surface of the panel around the opening, and a flexible second projection which is pressed into, and passed through the opening to engage with the lower surface of the panel around the opening, said main body being hollow and defining therein a space with an open top end and a bottom end which is closed at least when a portion of said article is inserted into the space through the open top end, said main body being provided on its inner surface with a flexible third projection which prevents withdrawal of said portion of the article inserted into the space in the main body.

The present invention will now be explained in detail by referring to some preferred embodiments shown in the drawings.

DETAILED EXPLANATION OF THE PREFERRED EMBODIMENTS

Figure 1:
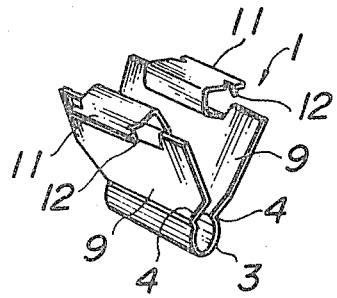
FIG. 1 is a perspective view showing the above-mentioned conventional retainer.
Figure 2:
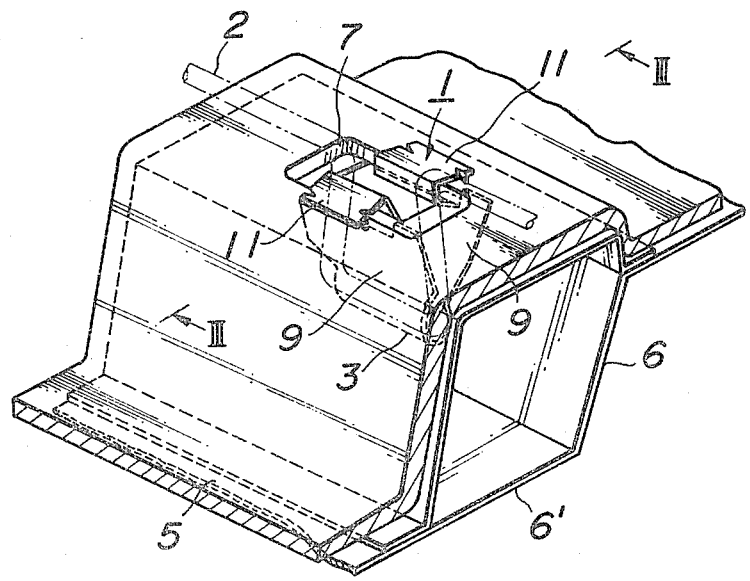
FIG. 2 is a perspective view showing the retainer of FIG. 1 in use.
Figure 3:
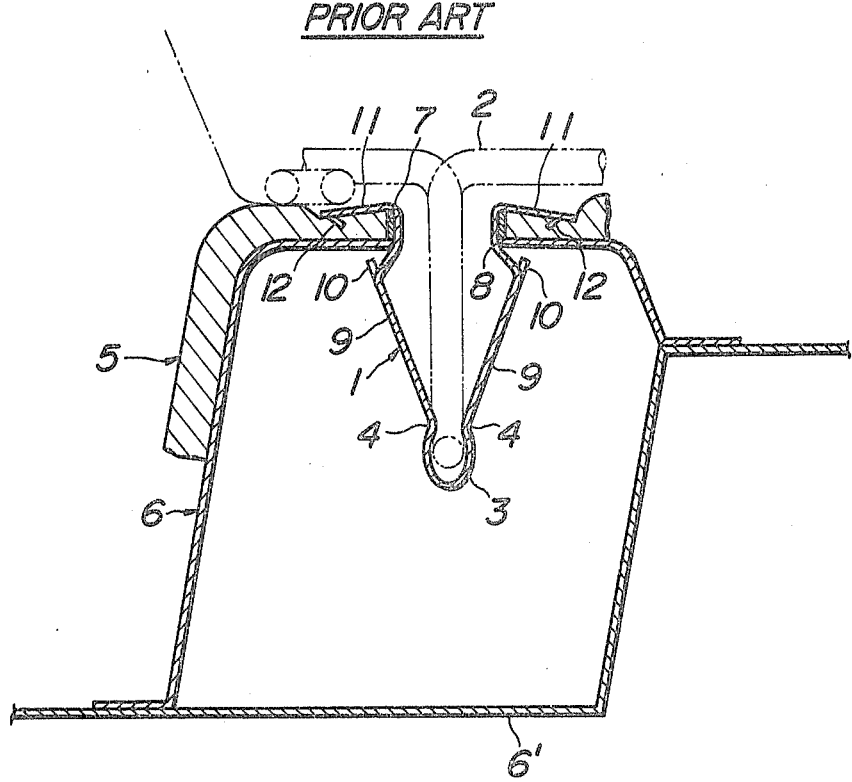
FIG. 3 is a sectional view taken along the line III—III in FIG. 2.
Figure 4:
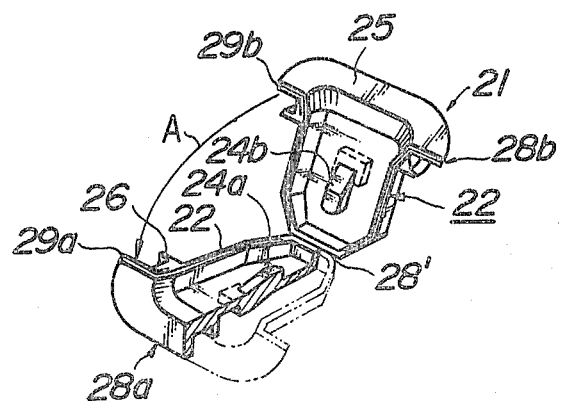
FIG. 4 is a perspective view, partly in section, showing the retainer according to a first embodiment of the present invention.
Figure 5:
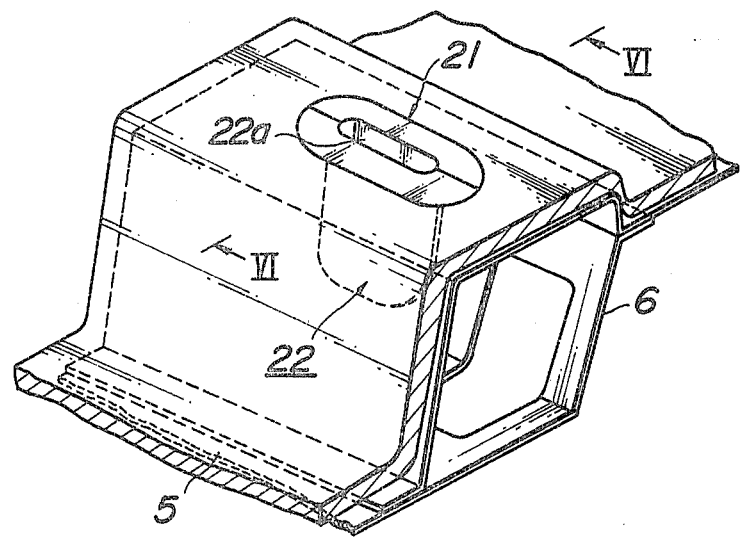
FIG. 5 is a perspective view showing the retainer of FIG. 4 in use.
Figure 6:
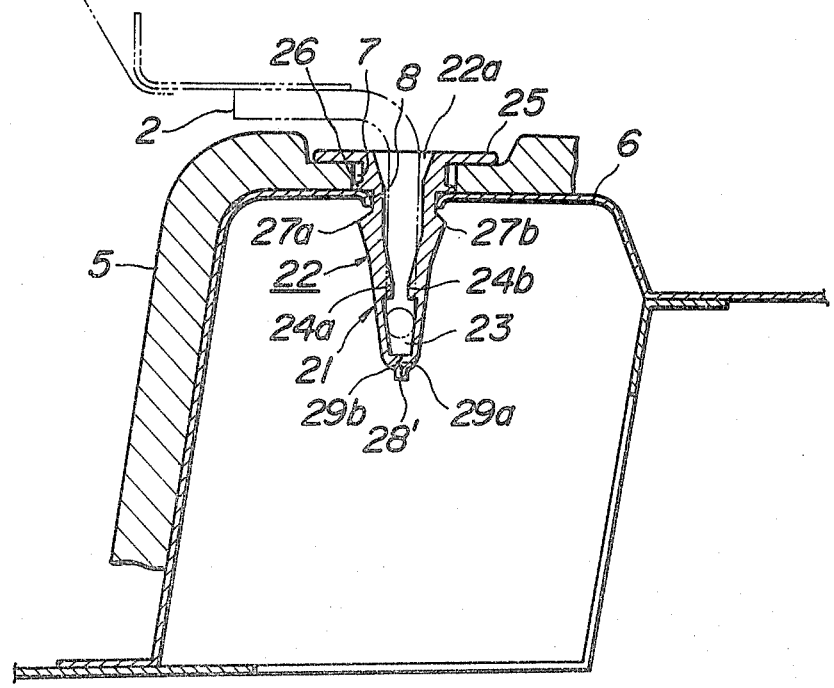
FIG. 6 is a sectional view taken along the line VI—VI in FIG. 5.

Referring now to FIGS. 4 to 6, there is shown a retainer according to a first embodiment of the present invention. The same reference numerals are used throughout the figures to denote the same or corresponding elements. The retainer of this embodiment, which is designated as a whole by the reference numeral 21, is integrally molded from plastics material, and includes a box-like main body 22 which is open only at the top end 22a. The main body 22 on its outer surface is provided with a flange 25 urged against the upper surface of the floor mat 5, an annular projection 26 which directly contacts the periphery of the opening 8 on the upper surface of the body panel 6, and a pair of projections 27a, 27b which engage with the periphery of the opening 8 on the lower surface of the body panel 6. The abovementioned open top end 22a of the main body 22 permits the substantially U-shaped extension 2 of the seat cushion frame to be inserted into the main body 22. This extension 2 is retained in the bottom portion 23 of the inner space of the main body 22. To this end, a pair of projections 24a, 24b are formed on the inner surface of the main body 22. Each of the projections 24a, 24b has an upper and a lower inclined surfaces so that the upper inclined surfaces allow a one-touch insertion of the extension 2 while the lower inclined surfaces prevent withdrawal of the extension 2 out of the bottom portion 23.

In order to facilitate the molding operation, the retainer 21 shown in FIGS. 4 to 6 consists of two pieces 28a, 28b whose bottom portions are connected to each other through a thin-walled hinge 28'. Those pieces 28a, 28b are substantially symmetrical, and superimposed with each other to form the box-like main body 22. The piece 28a has a parting surface in the form of a ridge 29a while the other piece 28b has a parting surface in the form of a groove 29b to receive therein the ridge 29a. By this, a tight sealing of the inner space of the main body 22 is achieved.

With the retainer shown in FIGS. 4 to 6, the seat cushion is secured to the vehicle body in the following manner. As shown in FIG. 4 by an arrow A, the two pieces 28a, 28b are folded about the hinge 28' toward each other so that the ridge 29a is received in the groove 29b. Thus formed box-like main body 22 is inserted into the openngs 7, 8 in the floor mat 5 and the body panel 6 until the annular projection 26 abuts against the periphery of the opening 8 on the upper surface of the body panel 6. In this condition, the floor mat 5 is compressed by the flange 25 to some extent so that the reaction force urges the pair of projections 27a, 27b against the periphery of the opening 8 on the lower surface of the body panel 6. The projections 27a, 27b in engagement with the body panel 6 prevent withdrawal of the retainer 21 from the body panel. Subsequently, the U-shaped extension 2 of the seat cushion frame is inserted into the inner space of the main body 22. By this insertion, the extension 2 is forcedly passed through the neck portion between the projections 24a, 24b, and retained at the bottom portion 23 of the inner space of the main body 22. The lower inclined surfaces of those projections 24a, 24b prevent withdrawal of the extension 2 out of the bottom portion 23 when the withdrawal force is less than a predetermined force decided by the angle of the lower surface. The insertion force and the withdrawal force may be adjusted by varying the angle of the upper and lower inclined surfaces of the projections 24a, 24b, respectively.

When the withdrawal force is applied to the U-shaped extension 2, which is more than the predetermined force, the projections 24a,24b are forced apart from each other to permit passage of the extension 2. At this instance, the outer projections 27a, 27b which are also expanded are maintained in engagement with the lower surface of the body panel 6. Thus the extension 2 can be withdrawn from the retainer 2 which is positively retained by the body panel 6.

Since the box-like main body 22 of the retainer 21 shown in FIGS. 4 to 6 has an inner space which is open only at the top end 22a, entry of water or dust into the cabin is effectively prevented even when the space below the body panel is not completely closed. By this, an open-section body structure can be used so that the weight can be reduced considerably. Further, the location of the retainers can be determined relatively freely. Those advantages can be achieved without deteriorating an easy one-touch mounting operation and positive retaining function.

Figure 7:
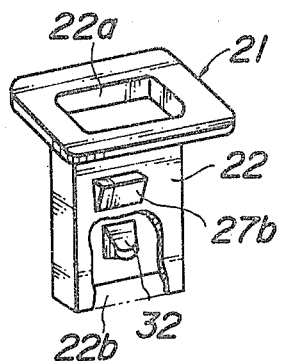
FIG. 7 is a partially cutaway perspective view of the retainer according to a second embodiment of the present invention.
Figure 8:
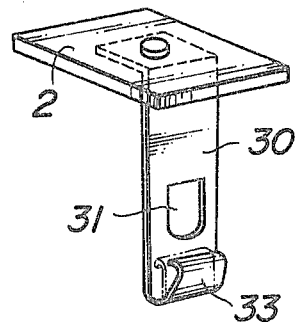
FIG. 8 is a perspective view of a bracket secured to a seat cushion frame and used in conjunction with the retainer shown in FIG. 7.
Figure 9:
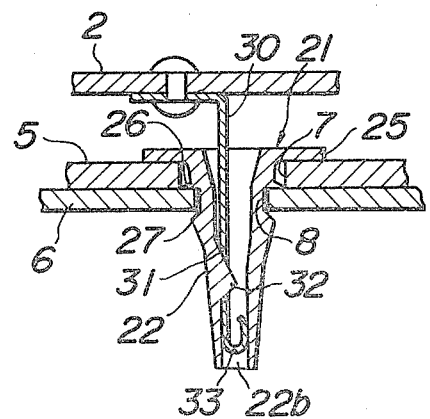
FIG. 9 is a sectional view showing the retainer of FIG. 7 in use.

FIGS. 7 to 9 show a retainer according to a second embodiment of the present invention. In this embodiment, the retainer 21 is substantially the same as that shown in FIGS. 4 to 6 except that the main body 22 is an integrally molded body with an open bottom end 22b. A generally J-shaped bracket 30 is secured to the seat cushion frame 2. This bracket 30 is formed with a hole 31 in which a projection 32 on the inner surface of the main body 2 engages. The upwardly bent end portion 33 of the bracket 30 is urged against the inner surface of the main body 22, and tightly closes the bottom end 22b.

Figure 12:
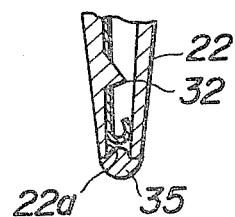
FIG. 12 is a fragmentary sectional view showing the modification of the retainer of FIG. 7.

The bottom end 22b of the main body 22 may be more completely closed by using a separate cover member 35, as shown in FIG. 12.

Figure 10:
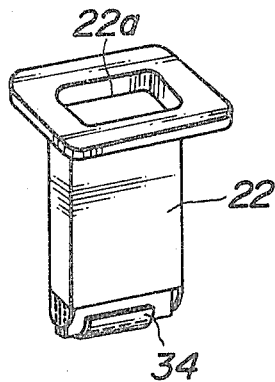
FIG. 10 is a perspective view showing the retainer according to a third embodiment of the present invention.
Figure 11:
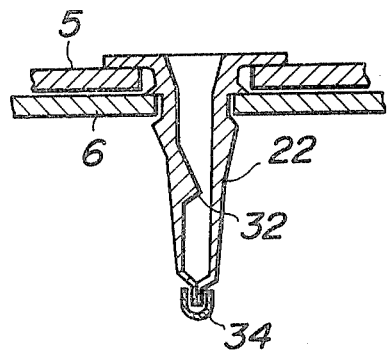
FIG. 11 is a sectional view showing the retainer of FIG. 10 in use.

In a third embodiment of the present invention shown in FIGS. 10 and 11, the lower portion of the main body 22 of the second embodiment is clamped by a suitable clamp member 34 to close the bottom end 22b.

According to the second and the third embodiment, the bottom end 22b of the main body is closed when the J-shaped bracket 30 of the seat cushion frame 2 is retained by the retainer. Consequently, all the advantages of the first embodiment can be achieved.

What is claimed is:

1. A retainer for securing an article to be arranged within a cabin of a vehicle to a vehicle body panel consisting of a relatively thin open section member comprising a main body which consists of plastics material and is adapted to be inserted into an opening in a panel forming a portion of the vehicle body, said main body being provided on its outer surface with a first projection which is urged against the upper surface of the panel around the opening, and a flexible second projection which is pressed into, and passed through the opening to engage with the lower surface of the panel around the opening, said main body being hollow and defining therein a space with an open top end and a bottom end which is closed at least when a portion of said article is inserted into the space through the open top end, said main body being provided on its inner surface with a flexible third projection which prevents withdrawal of said portion of the article inserted into the space in the main body, said main body consisting of two pieces which are connected to each other through a thin-walled hinge which forms the bottom portion of the main body and which closes the bottom end of the space in the main body, the two pieces being provided with parting surfaces, one of which is formed as a ridge while the other of which is formed as a groove to receive therein the ridge.

2. A retainer as claimed in claim 1, wherein the first projection cnsists of an annular projection.

3. A retainer as claimed in claim 1, wherein the second projection comprises a lower inclined surface which permits passage of the second projection through the opening in the panel.

4. A retainer as claimed in claim 1, wherein the third projection comprises an upper inclined surface which permits insertion of said portion of the article into the space in the main body.

5. A retainer as claimed in claim 4, wherein the third projection further comprises a lower inclined surface which is steeper than the upper inclined surface such that said portion of the article can be withdrawn from the space in the main body only by applying a force which is more than the force required for the insertion.

* * * * *

UNITED STATES PATENT OFFICE
CERTIFICATE OF CORRECTION

PATENT NO. : 4,409,707
DATED : October 18, 1983
INVENTOR(S) : Masakazu Muraishi and Kimio Sawazaki It is certified that error appears in the above-identified patent and that said Letters Patent are hereby corrected as shown below:

[30]    Foreign Application Priority Data should read:

-- October 26, 1979 [JP]   Japan.......54-149431[U] --.

Signed and Sealed this

Thirtieth Day of October 1984

[SEAL]

Attest:

GERALD J. MOSSINGHOFF

Attesting Officer    Commissioner of Patents and Trademarks